(12) United States Patent
Mauch et al.

(10) Patent No.: US 11,175,379 B2
(45) Date of Patent: Nov. 16, 2021

(54) HOUSING ARRANGEMENT FOR A RADAR SENSOR

(71) Applicant: BAUMER ELECTRIC AG, Frauenfeld (CH)

(72) Inventors: Rainer Mauch, Hilzingen (DE); Michael Weigel, Muellheim (CH); Egbert Visscher, Au (CH)

(73) Assignee: BAUMER ELECTRIC AG, Frauenfeld (CH)

(*) Notice: Subject to any disclaimer, the term of this patent is extended or adjusted under 35 U.S.C. 154(b) by 335 days.

(21) Appl. No.: 16/281,106

(22) Filed: Feb. 21, 2019

(65) Prior Publication Data
US 2019/0265329 A1 Aug. 29, 2019

(30) Foreign Application Priority Data
Feb. 28, 2018 (EP) .................................... 18159042

(51) Int. Cl.
| G01S 7/03 | (2006.01) |
| G01S 13/931 | (2020.01) |
| G01S 7/02 | (2006.01) |

(52) U.S. Cl.
CPC .............. *G01S 7/032* (2013.01); *G01S 7/023* (2013.01); *G01S 13/931* (2013.01); *G01S 7/027* (2021.05)

(58) Field of Classification Search
CPC .... G01S 7/023; G01S 7/032; G01S 2007/027; G01S 13/931; H01Q 1/42; H01Q 1/422
See application file for complete search history.

(56) References Cited

U.S. PATENT DOCUMENTS

| 3,413,636 | A | * | 11/1968 | Migdal | H01Q 15/23 342/11 |
| 4,282,527 | A | * | 8/1981 | Winderman | H01Q 5/45 342/53 |
| 4,477,814 | A | * | 10/1984 | Brumbaugh | H01Q 21/20 342/53 |
| 5,191,351 | A | * | 3/1993 | Hofer | H01Q 1/36 343/708 |
| 5,438,333 | A | * | 8/1995 | Perkins | H01Q 17/001 342/4 |
| 5,455,589 | A | * | 10/1995 | Huguenin | G01S 7/032 342/175 |
| 5,991,474 | A | * | 11/1999 | Baldi | G01S 7/032 385/15 |
| 6,150,974 | A | * | 11/2000 | Tasaka | F41G 7/008 244/3.16 |

(Continued)

FOREIGN PATENT DOCUMENTS

| DE | 4412770 A1 * 10/1995 .......... H01Q 19/062 |
| DE | 103 16 535 B3 1/2005 |

(Continued)

*Primary Examiner* — Peter M Bythrow
(74) *Attorney, Agent, or Firm* — Norman B. Thot

(57) ABSTRACT

A housing arrangement for a radar sensor includes at least one tubular body and a shielding device for radar beams. The at least one tubular body has a distal end which has a lens mounted therein, and a side wall. The shielding device is arranged on the side wall on an outer side of the at least one tubular body. The at least one tubular body is made of a dielectric plastic. The shielding device is made of a metal.

13 Claims, 9 Drawing Sheets

(56) References Cited

U.S. PATENT DOCUMENTS

| | | | |
|---|---|---|---|
| 6,366,245 B1* | 4/2002 | Schmidt | G01S 7/032 343/700 MS |
| 6,501,417 B1* | 12/2002 | Bowlds | G01S 7/032 342/104 |
| 6,606,066 B1* | 8/2003 | Fawcett | G01J 5/0815 343/725 |
| 6,674,392 B1* | 1/2004 | Schmidt | G01S 13/931 342/70 |
| 6,674,412 B1* | 1/2004 | Schmidt | H01Q 25/00 343/872 |
| 6,924,772 B2* | 8/2005 | Kiernan, Jr. | F41G 7/008 343/720 |
| 7,786,418 B2* | 8/2010 | Taylor | G01S 13/867 244/3.16 |
| 9,768,517 B2* | 9/2017 | Binzer | H01Q 17/00 |
| 2001/0013842 A1* | 8/2001 | Ishikawa | H01Q 19/06 343/912 |
| 2005/0052313 A1* | 3/2005 | Suzuki | G01S 7/032 342/70 |
| 2007/0115196 A1* | 5/2007 | Motzer | H01Q 13/0208 343/786 |
| 2010/0188296 A1* | 7/2010 | Gard | G01F 23/284 343/702 |
| 2011/0025553 A1* | 2/2011 | Cooke | H01Q 13/24 342/175 |
| 2011/0147573 A1* | 6/2011 | Liess | G02B 7/025 250/239 |
| 2012/0206312 A1* | 8/2012 | Coupland | H01Q 1/225 343/786 |
| 2012/0249357 A1* | 10/2012 | Stratis | F41G 7/2246 342/54 |
| 2012/0262331 A1* | 10/2012 | Kienzle | G01F 23/284 342/124 |
| 2014/0047917 A1* | 2/2014 | Vogt | H01Q 19/062 73/290 V |
| 2014/0375490 A1* | 12/2014 | Pfitzenmaier | H01Q 17/008 342/4 |
| 2015/0022389 A1* | 1/2015 | Binzer | G01S 7/02 342/1 |
| 2015/0241261 A1* | 8/2015 | Cheng | G01S 13/88 342/124 |
| 2016/0320224 A1* | 11/2016 | Eriksson | B65D 90/48 |
| 2016/0370456 A1 | 12/2016 | Emanuelsson | |
| 2017/0146637 A1* | 5/2017 | Schwendimann | G01S 7/032 |
| 2017/0350580 A1 | 12/2017 | Honda et al. | |
| 2018/0212316 A1* | 7/2018 | Janitch | G01S 7/02 |

FOREIGN PATENT DOCUMENTS

| | | |
|---|---|---|
| DE | 10 2011 122 346 A1 | 6/2013 |
| DE | 10 2014 109 105 A1 | 12/2015 |
| DE | 10 2017 112 187 A1 | 12/2017 |
| EP | 3 107 151 A1 | 12/2016 |
| EP | 3 171 197 A2 | 5/2017 |

\* cited by examiner

US 11,175,379 B2

HOUSING ARRANGEMENT FOR A RADAR SENSOR

CROSS REFERENCE TO PRIOR APPLICATIONS

Priority is claimed to European Patent Application No. EP 18159042.3, filed Feb. 28, 2018. The entire disclosure of said application is incorporated by reference herein.

FIELD

The present invention relates to a housing arrangement for a radar sensor as well as a radar sensor.

BACKGROUND

A previously-described housing arrangement for a radar sensor comprises a tubular body, whereby a lens can be mounted or is mounted at a distal end of the tubular body. The tubular body serves to fix the lens at a precisely defined focal distance from the radar transmitter and radar receiver.

Such radar sensors are used in various areas, for example, in order to measure filling states in containers or to measure distances between machine parts. Such sensors are also used to measure distances with vehicles in order to avoid collisions between vehicles or to measure a distance to the ground or to plants in agricultural applications.

SUMMARY

An aspect of the present invention is to provide a housing arrangement for a radar sensor with which measurements can be improved.

In an embodiment, the present invention provides a housing arrangement for a radar sensor which includes at least one tubular body and a shielding device for radar beams. The at least one tubular body comprises a distal end which is configured to have a lens be mounted therein, and a side wall. The shielding device is arranged on the side wall on an outer side of the at least one tubular body. The at least one tubular body is made of a dielectric plastic. The shielding device is made of a metal.

BRIEF DESCRIPTION OF THE DRAWINGS

The present invention is described in greater detail below on the basis of embodiments and of the drawings in which.

DETAILED DESCRIPTION

Figure 1:
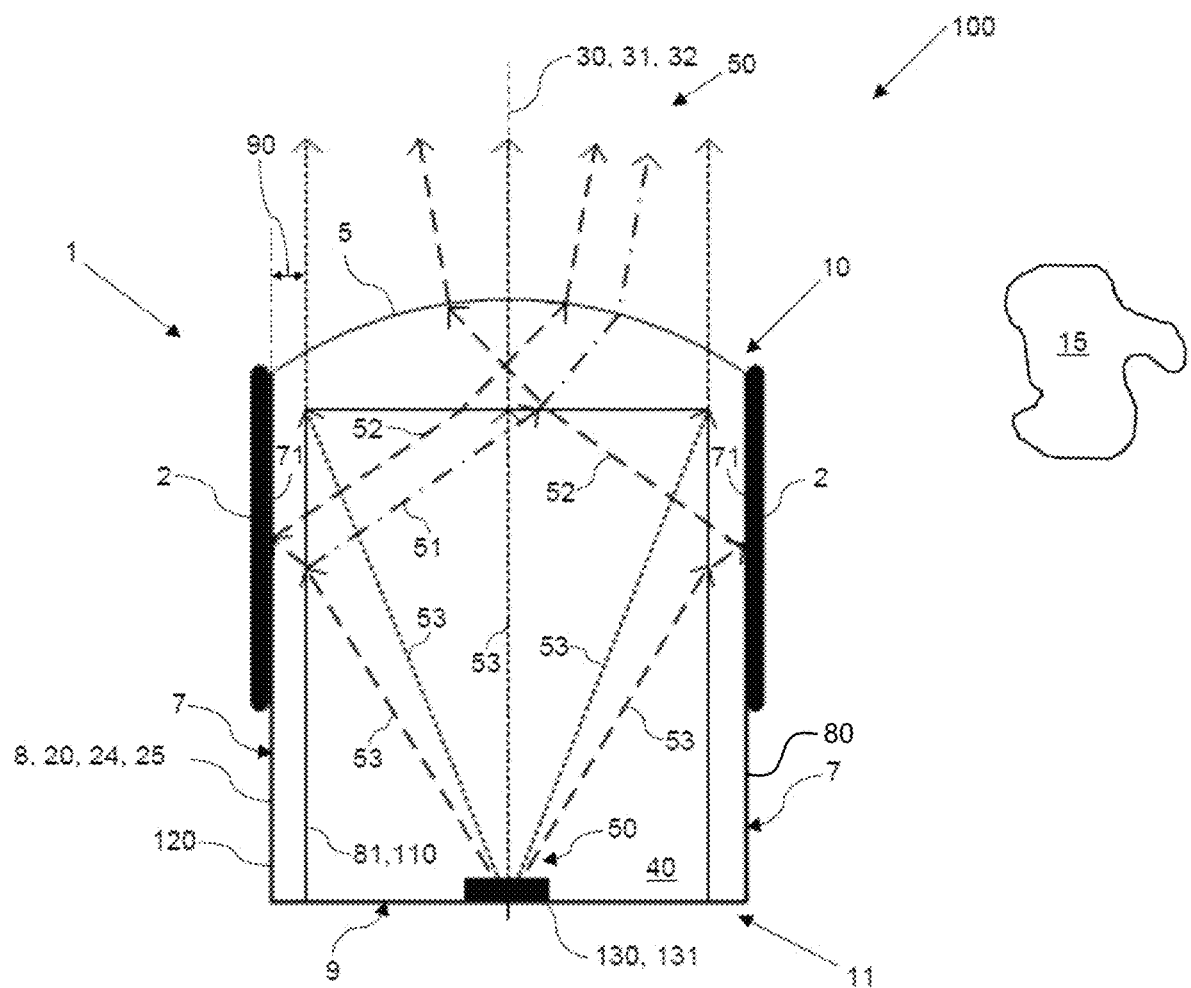
FIG. 1 shows a schematic cross-sectional view of a first embodiment of a housing arrangement of a part-area for a radar sensor.

A radar sensor in accordance with the present invention comprises a housing arrangement in accordance with the present invention and a radar transmitter and/or a radar receiver.

The present invention prevents radar beams from entering or leaving laterally. Interference signals caused by objects lying in a side area are therefore minimized or completely prevented.

The present invention can be further improved with the following embodiments, each of which is in itself advantageous and each of which can be combined with each other in any way required, and with the below developments. These embodiments may also be used independently of the above-mentioned embodiment.

In an embodiment of the present invention, the tubular body can, for example, have a constant cross-section, in particular along one measurement direction. This can lead to good bundling of the radar radiation.

In an embodiment of the present invention, the tubular body can, for example, have a hollow cylindrical design. Such a design can be particularly easy to manufacture. The tubular body can, for example, in particular have a circular cylindrical design. Such a design can be easy to manufacture and have good measurement properties. The shielding device can, for example, only be located at some parts of the tubular body. Only selected parts can, for example, be provided with a shielding device and behind which parts which are moving in operation are arranged.

In an embodiment of the present invention, the shielding device can, for example, be closed in a ring shape around a radiation axis and/or around an axis of symmetry. A particularly good shielding in different directions is achieved thereby.

In an embodiment of the present invention, the shielding device can, for example, be designed to extend from the distal end to a proximal end. This makes a particularly good shielding possible along a measuring direction. The proximal end may be opposite to the distal end. A radar transmitter and/or a radar receiver can, for example, be arranged at the proximal end in the interior of the housing arrangement.

In an embodiment of the present invention, the tubular body can, for example, be provided in one piece with the lens in order to simplify manufacture. In another embodiment of the present invention, the lens can, for example, be attached to the body, for example, by glue, screws, clamps and/or clips.

In an embodiment of the present invention, the shielding device can, for example, comprise a layer applied to the tubular body. Such a design can be particularly light. The layer can, for example, be applied by vapor plating, spraying, immersion, galvanic application or via a similar application procedure.

In an embodiment of the present invention, the shielding device can, for example, comprise a foil. Such a design can be particularly easy to manufacture. A shielding foil can, for example, be bonded on. The foil may be part of a tape or adhesive band in order to allow for an easy application.

In an embodiment of the present invention, the shielding device may alternatively or additionally comprise a part which is separate from the tubular body. A shielding ringshaped element can, for example, be mounted on or in the tubular body. Such an element can, for example, be pushed onto or into the tubular body. The shielding device may be interchangeable in such an embodiment so that, for example, a different, individually adapted shielding device can be used depending on the application required.

In an embodiment of the present invention, the shielding device can, for example, be arranged on an outer side of the tubular body. This arrangement can in particular reduce interfering reflections which may occur, for example, if the shielding device is located on an inner side of the tubular body and thus in the vicinity of a radar transmitter and/or of a radar receiver.

If the shielding device is located on an outer side of the tubular body, it can be advantageous if one wall thickness of the side wall of the tubular body in the region of the shielding device is designed to achieve at least a partial mutual weakening or elimination of two radar waves which are reflected on the front side and the rear side of the side wall. This is the case, for example, if the travel difference of the two reflected waves is $\lambda/2$, that is, half a wavelength. The rear side in this case is the side on which the shielding device is located. The wave is reflected at least partially on the front side and almost 100% on the rear side with the shield. In the superposition of the two reflected waves, the two are out of phase with each other, so that at least a partial elimination occurs. This causes an interference signal to be reduced. An adjustment of the phase difference may be effected, for example, by adjusting the material thickness in the region of the shield. The angle at which the waves strike must also here be taken into account. The thickness of the side wall may vary depending on a distance from the radar transmitter. For example, it may be thicker in the vicinity of the radar transmitter since the radar radiation here strikes the side wall at a steeper angle. The wall thickness may be reduced in more distant areas since the strike angle here is shallower.

If the shielding device is arranged outside, an embodiment of the present invention provides that the shielding device can, for example, be covered from the outside by a protective device in order to protect the shielding device from mechanical damage.

In an embodiment of the present invention, the tubular body can, for example, comprise a material, at least sectionwise, which absorbs the radar waves. This can further reduce interference signals. The absorbing effect can in particular be adapted to the wavelength of the radar radiation so that in particular radiation of the wavelength used is especially greatly reduced. An absorbent material may in particular be located in the region of the shielding device to absorb the radiation.

In an embodiment of the present invention, the tubular body can, for example, comprise a material, at least sectionwise, which contains conductive particles. Such conductive particles can absorb the radiation. These may be, for example, metal particles, nanotubes or conductive carbon black. The size of the metal particles or nanotubes can be adapted to the wavelength of the radar radiation in order to achieve good absorption.

In an embodiment of the present invention, the material of the shielding device can, for example, comprise a material that is at least partially reflective. The material of the shielding device can, for example, include a metal.

The present invention is described in greater detail using examples on the basis of advantageous embodiments under reference to the drawings. The advantageous further developments and embodiments shown here are independent of each other and can be combined as required, depending on the requirements of the particular application.

FIG. 1 shows a radar sensor 100 with a first embodiment of a housing arrangement 1. The housing arrangement 1 in particular comprises a tubular body 8 which extends from a proximal end 11 to a distal end 10.

The tubular body 8 may in particular be designed as a cylinder 20, and specifically a circular cylinder 25. Cylinder 20 is in particular a hollow cylinder 24 which has an interior compartment 40.

A radar transmitter 130 and a radar receiver 131 are located at the proximal end 11 in the interior compartment 40 on a rear wall 9. The radar transmitter 130 and the radar receiver 131 serve to transmit radar radiation 50 and to receive the radar radiation 50, respectively, reflected by the objects to be measured (not shown). The reflected signal can then be evaluated and, for example, the speed or the distance of an object can thus be determined. Radiation is effected approximately symmetrically around a radiation axis 30. The radiation axis 30 forms a longitudinal measuring axis 32. The individual radar beams propagate along individual propagation directions 53.

The radiation axis 30 at the same time corresponds approximately to the axis of symmetry 31 of the housing arrangement 1.

A lens 5 is located at the distal end 10 to bundle the radar radiation 50. In the shown example, the lens 5 is provided in one piece with the tubular body 8. Both can be produced, for example, from a dielectric plastic manufactured by injection molding.

An interfering object 15 exists in addition to the radar sensor 100. The interfering object 15 would, in previous systems, cause interference due to laterally emitted radar waves, especially if the interfering object 15 is moving. It is difficult to separate the signals thus generated from the useful signal using metrological or software methods.

The embodiment shown has a shielding device 2 on a side wall 7 of the tubular body 8. The shielding device 2 shields the radar radiation 50 so that it cannot strike the interfering object 15. The radar radiation 50 is reflected by the shielding device 2 and thrown back and inwards, and then projected further forward.

The shielding device 2 may be a layer 21 which has been applied to the side wall 7, for example, by vapor plating, application or similar procedures. The shielding device 2 may also be a foil 22 which was attached, for example, as part of an adhesive tape. In a further embodiment of the present invention, the shielding device 2 can, for example, be a separate, necessarily conductive (metal) part 23 which was pushed onto the housing arrangement 1.

It can be advantageous for the shielding device 2 to extend around the radiation axis 30 and/or the axis of symmetry 31 in a closed ring shape so that the shielding device 2 can achieve a good range of protection. The shielding device 2 shown here is approximately cylindrical.

In the embodiment shown in FIG. 1, the shielding device 2 is located on an outer side 80 of the tubular body 8. The wall thickness 90 is at the same time adapted in a region 71 of the shielding device 2 so that, in the case of a reflection on a front side 110 of the side wall 7 and a rear side 120 of the side wall 7, an at least partial elimination of the radar radiation 50 is provided. A first reflected wave 51, which was reflected on the front side 110, which at the same time is the inside 81 of the side wall 7, and a second reflected wave 52, which was reflected on the rear side 120 of the side wall 7, have a phase difference of approximately half a wavelength ($\lambda/2$) so that, at some distance, they overlap destructively, at least partially. The wall thickness 90 required therefor depends, among other things, on the refractive index of the material of the side wall 7 and the angle at which the radar radiation 50 strikes the region 71. In a front region, which is located at the distal end 10, the wall thickness 90 may be thinner than in a rear region, which is located at the proximal end 11, due to the shallower angle at which the radar radiation 50 strikes.

Figure 2:
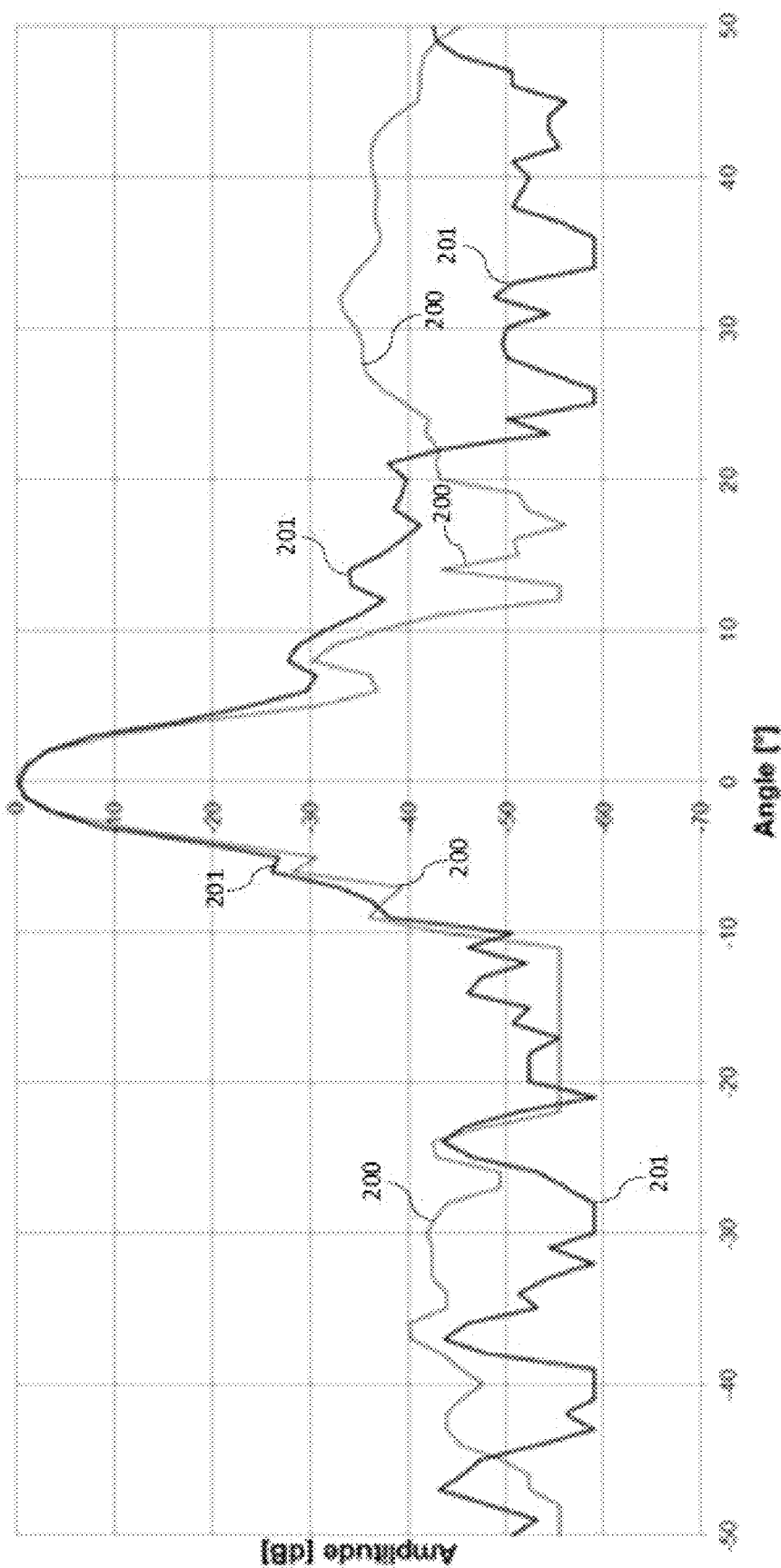
FIG. 2 shows a diagram of a signal on a first level with and without a shielding device.
Figure 3:
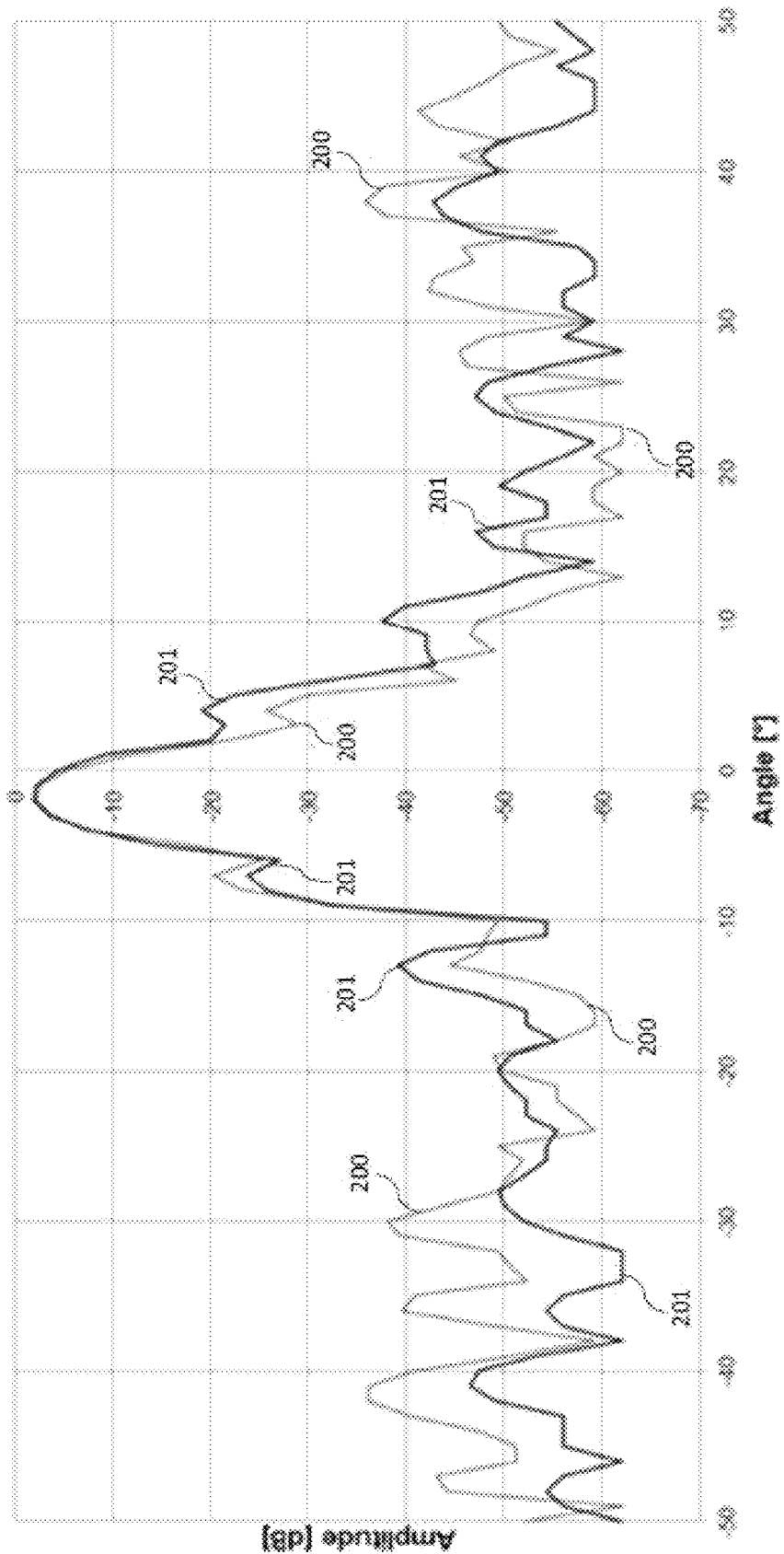
FIG. 3 shows a diagram of the signal on a second level with and without a shielding device.

FIGS. 2 and 3 show two diagrams which compare a measurement with and without a shielding device 2. In the case of a measurement with the shielding device 2, the signals 201 are better than the signals 200 of a measurement without the shielding device 2. The reason for the differences between FIGS. 2 and 3 is the fact that the radar transmitter 130 and the radar receiver 131 are located slightly asymmetrically in the housing arrangement 1.

Figure 4:
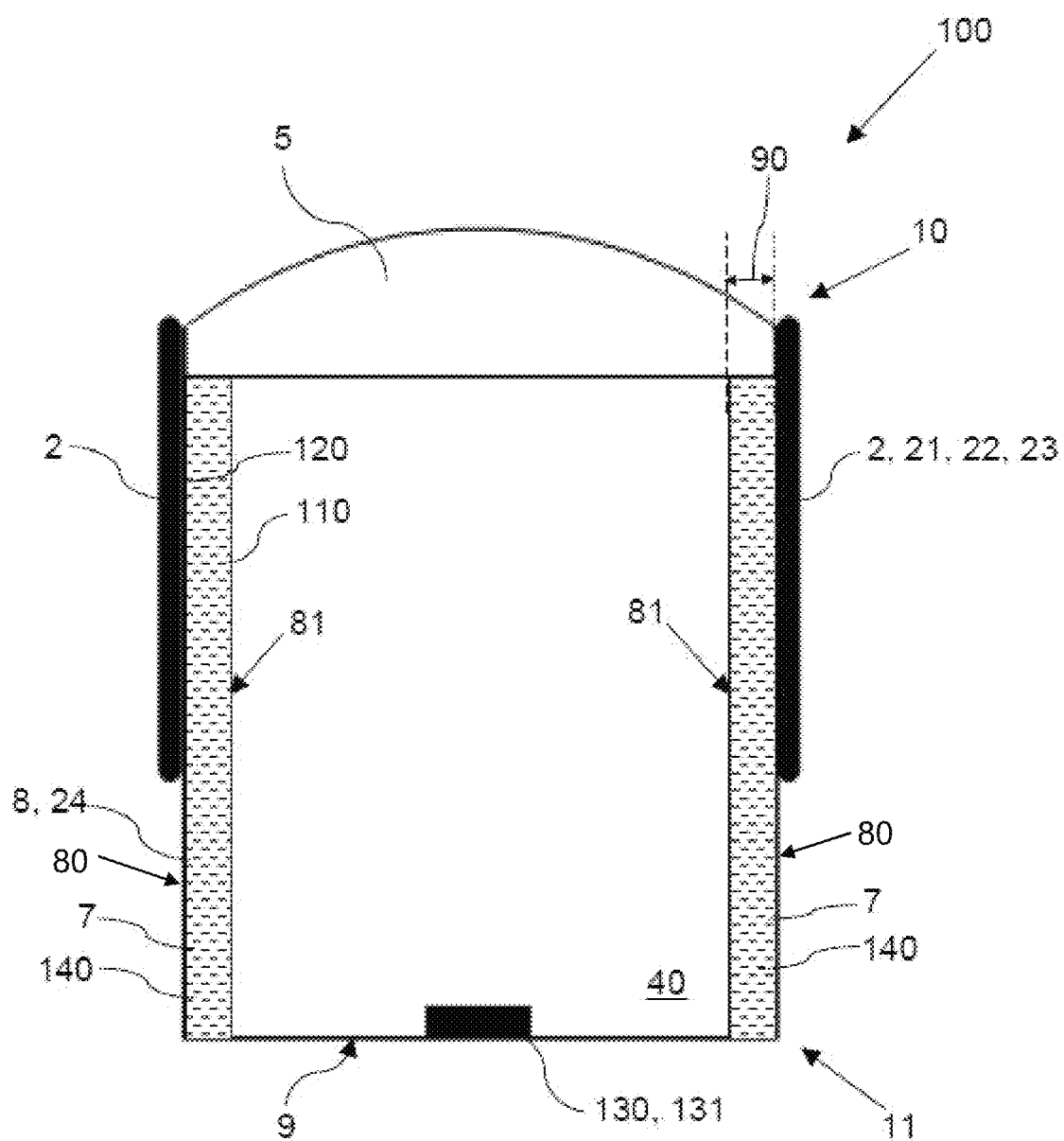
FIG. 4 shows a schematic cross-sectional view of a second embodiment.

FIG. 4 shows a further embodiment of the present invention where radar sensor 100 the lens 5 are not provided as one piece with the housing arrangement 1. Lens 5 is much rather mounted on the housing arrangement 1 at the distal end 10. In this embodiment, the housing arrangement 1 is made of a material which contains conductive particles 140, such as metal particles, nanotubes or carbon black. Such an embodiment additionally absorbs the radar radiation 50 so that less radar radiation 50 can escape laterally or can be reflected back into the interior compartment 40.

Figure 5:
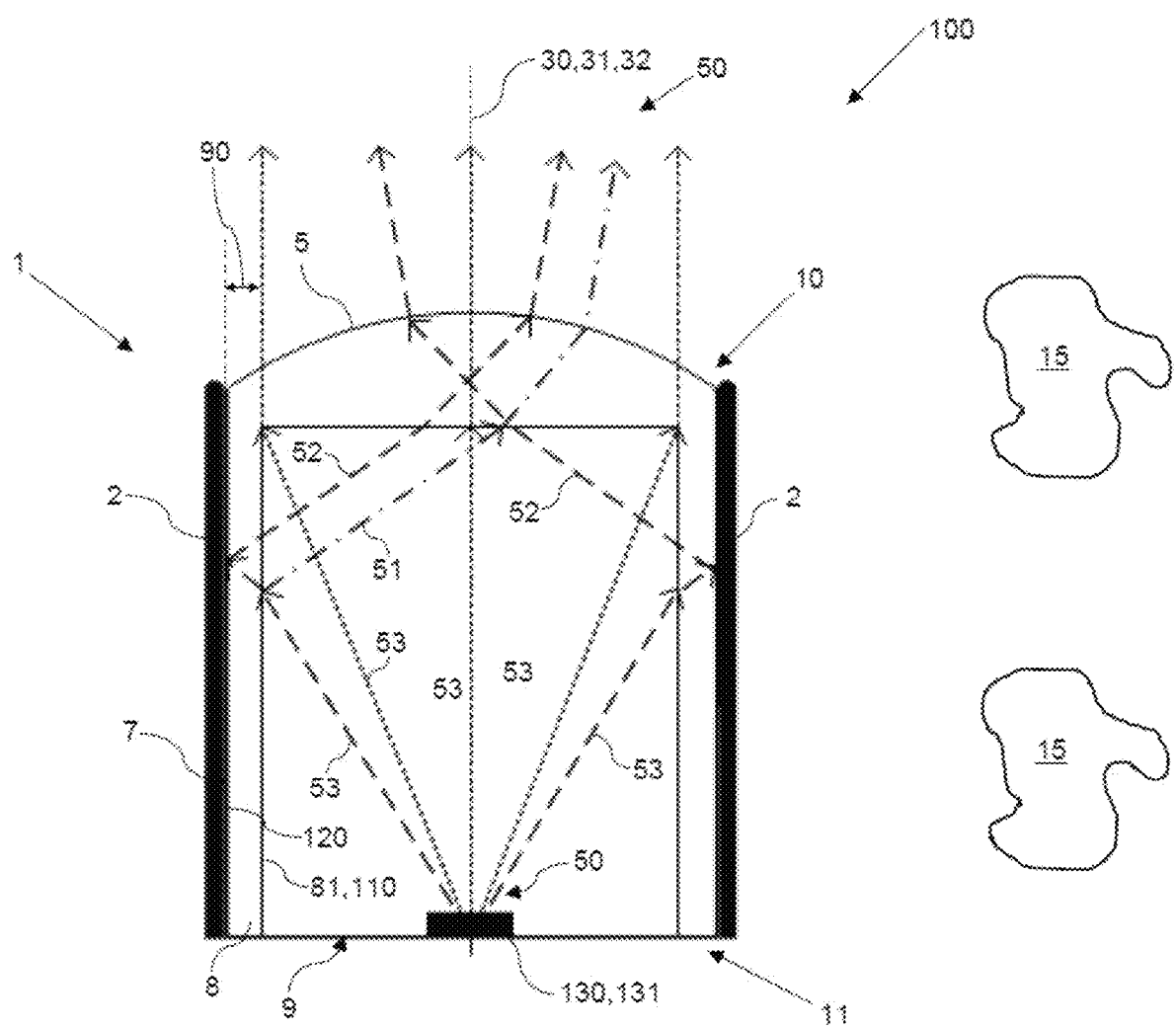
FIG. 5 shows a schematic cross-sectional view of a third embodiment.

FIG. 5 shows a further embodiment of a housing arrangement 1 which is similar to the embodiment in FIG. 1. The shielding device 2 here extends along the entire longitudinal measuring axis 32 from the distal end 10 to the proximal end 11. This makes an even better shielding possible.

Figure 6:
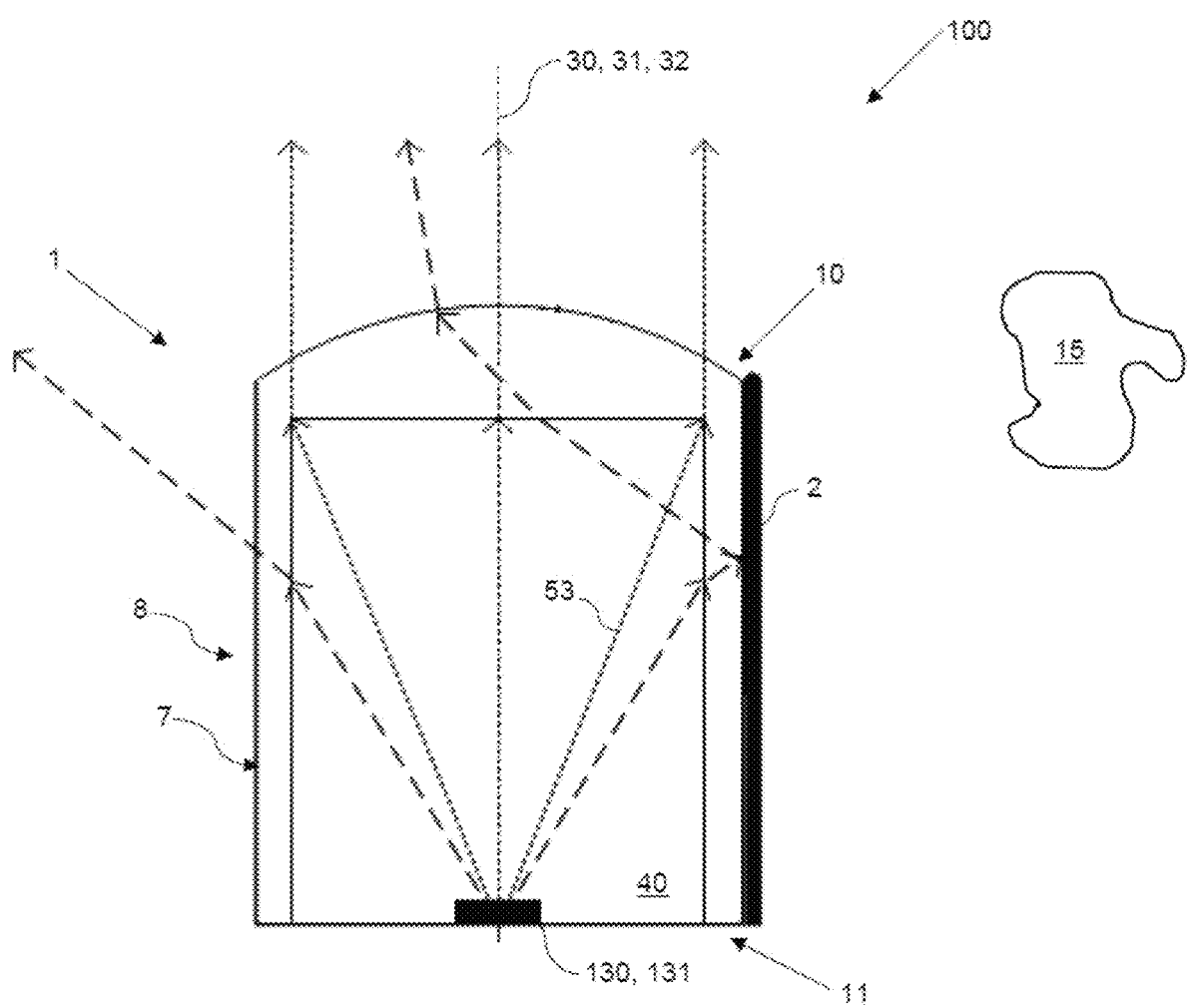
FIG. 6 shows a schematic cross-sectional view of a fourth embodiment.

FIG. 6 shows a further embodiment in which the shielding device 2 extends from the distal end 10 to the proximal end 11, but is not closed in a ring shape around the longitudinal measuring axis 32, but only covers a part of this circumference. This may be sufficient for some applications and, in particular, may have less weight than a fully closed embodiment.

Figure 7:
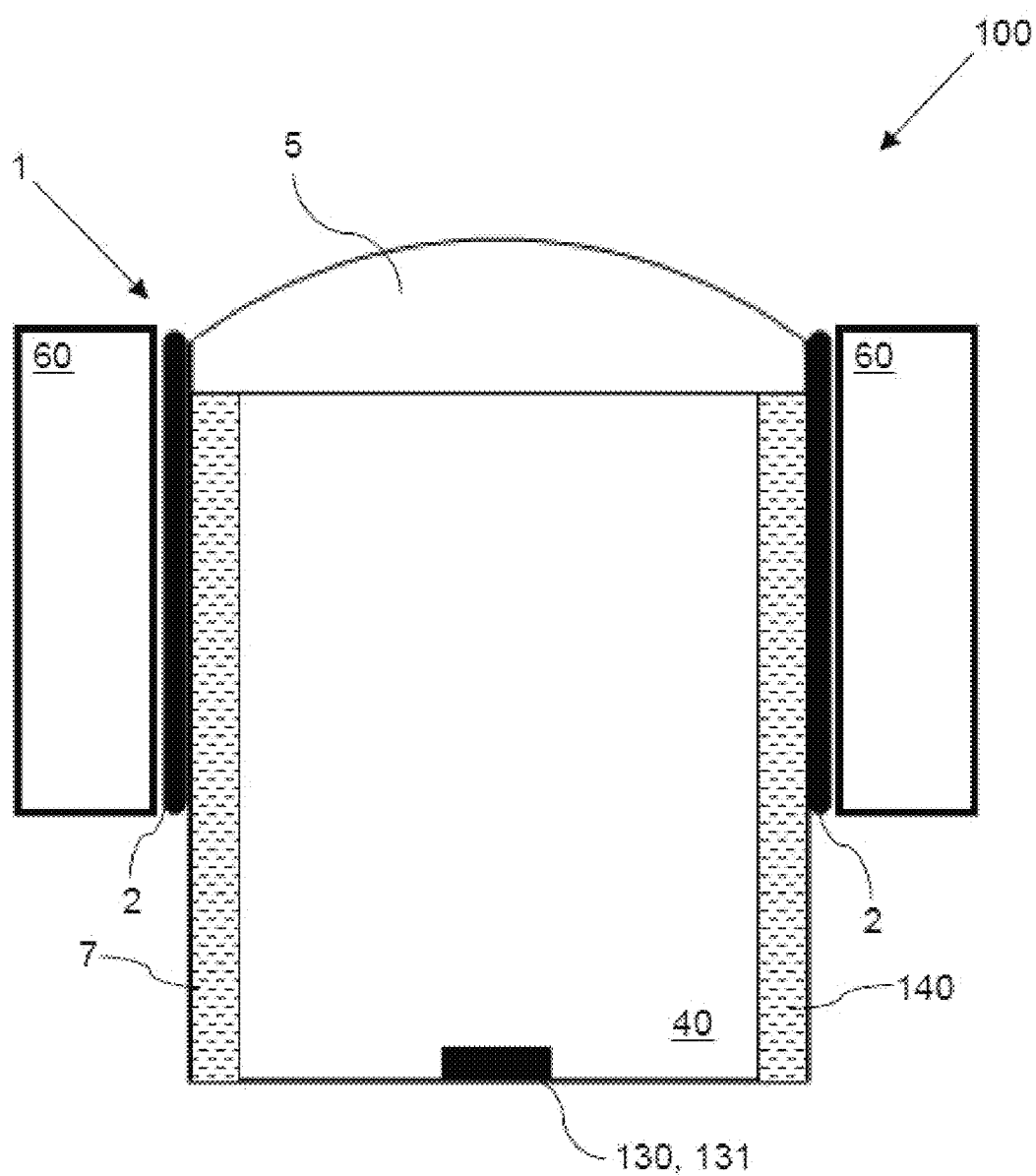
FIG. 7 shows a schematic cross-sectional view of a fifth embodiment.

FIG. 7 shows a further embodiment of the present invention where the housing arrangement 1 again has conductive particles 140. The radar sensor 100 additionally has a protective device 60 arranged around the outside of the shielding device 2 to protect the shielding device 2 from mechanical damage. The protective device 60 can, for example, be a ring that is pushed over the shielding device 2.

Figure 8:
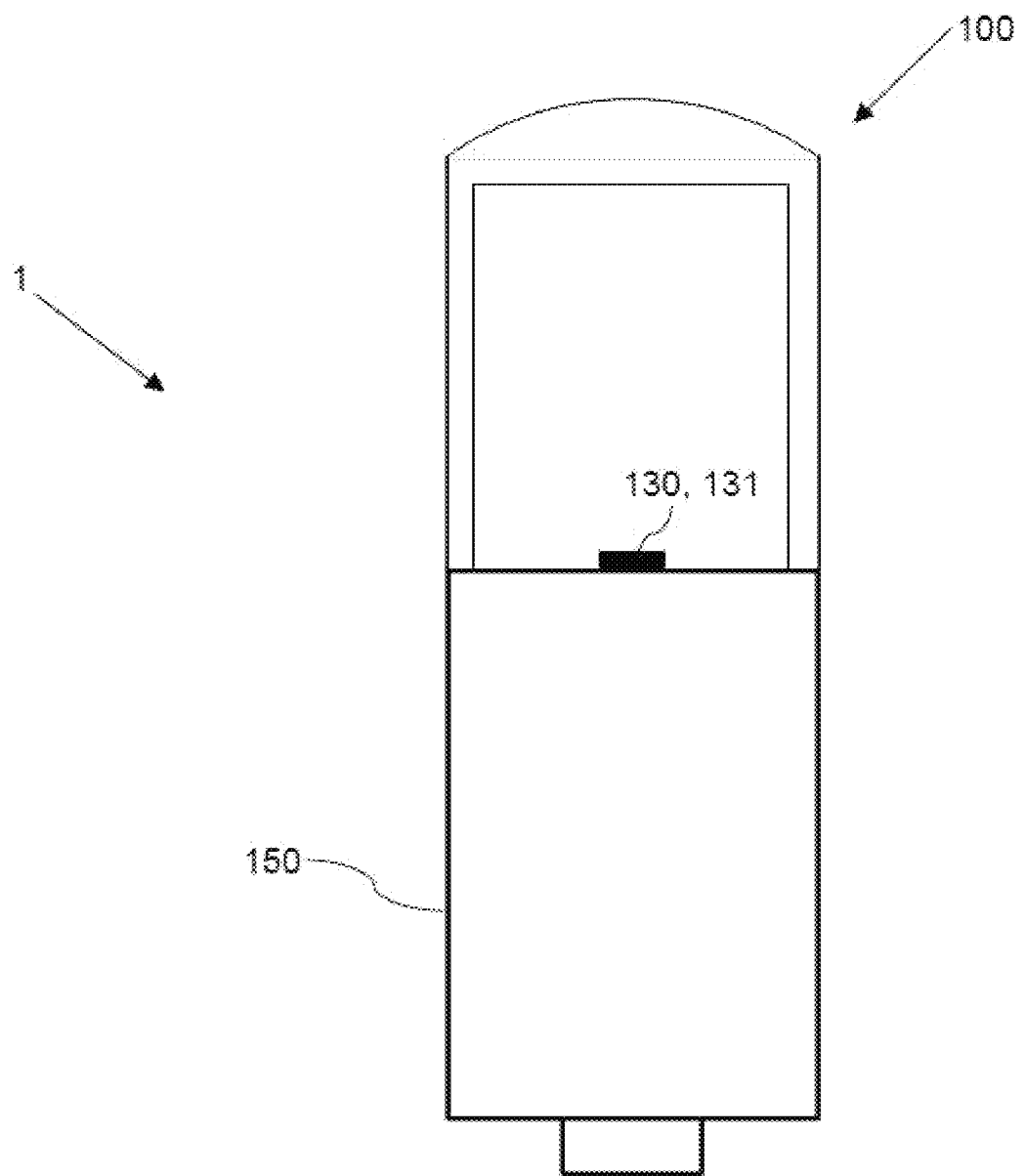
FIG. 8 shows a schematic cross-sectional view of an embodiment of a housing arrangement of a cylindrical radar sensor.

FIG. 8 shows an embodiment of an entire housing arrangement 1 of a cylindrical radar sensor 100. In this embodiment, the housing arrangement 1 comprises a cylindrical housing 150 in which at least one PCB is located with the radar transmitter 130 and the radar receiver 131 and at least one connector, and on which the radar sensor 100 is mounted. In a particularly advantageous embodiment, the cylindrical housing 150 can, for example, be made of metal. The cylindrical housing 150 can, however, also be made of another material, for example, of plastic. The cylindrical housing 150 allows the installation of the housing arrangement 1 in round holes.

Figure 9:
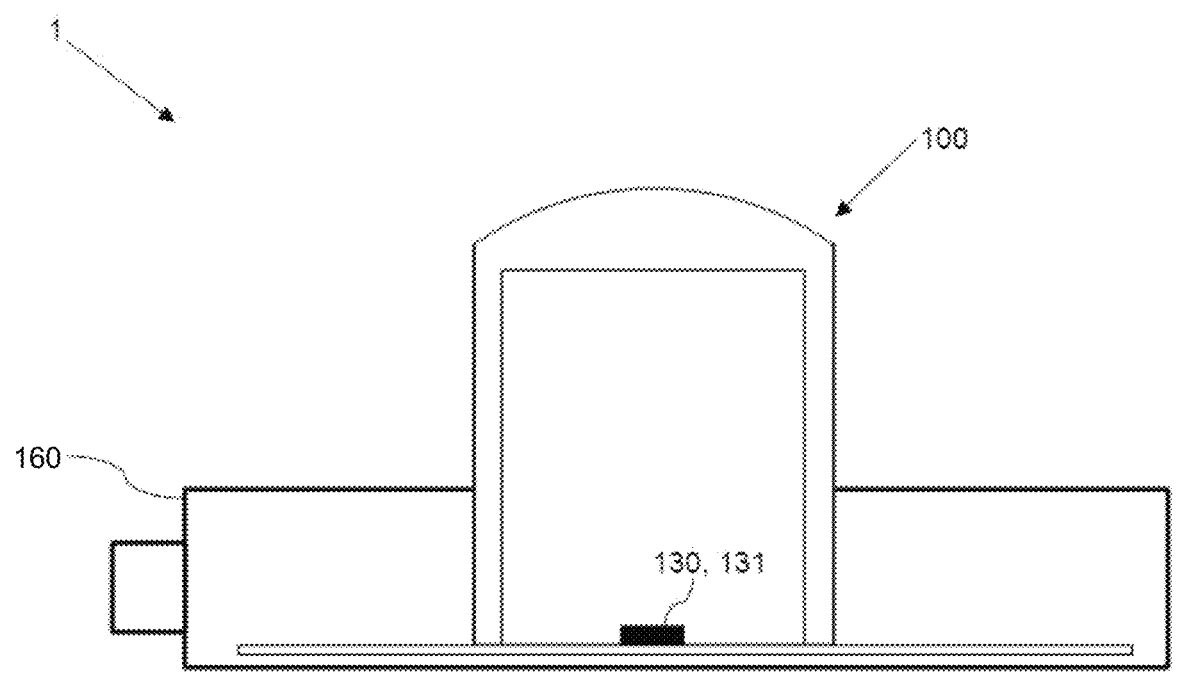
FIG. 9 shows a schematic cross-sectional view of an embodiment of a housing arrangement of a cubical radar sensor.

FIG. 9 shows a further embodiment of the present invention. In this embodiment, the housing arrangement 1 comprises a cubical housing 160 from which the radar sensor 100 protrudes. At least one PCB with the radar transmitter 130 and the radar receiver 131 and a connector can be arranged in the cubical housing 160. The cubical housing 160 allows the installation of the housing arrangement 1 on flat surfaces.

The present invention is not limited to embodiments described herein; reference should be had to the appended claims.

What is claimed is:

1. A housing arrangement for a radar sensor, the housing arrangement comprising:
    at least one tubular body comprising,
        a distal end which is configured to have a lens be mounted therein, and
        a side wall; and
    a shielding device for radar beams arranged on the side wall on an outer side of the at least one tubular body, wherein,
    the at least one tubular body is made of a dielectric plastic, and
    the shielding device is made of a metal.

2. The housing arrangement as recited in claim 1, wherein the at least one tubular body is configured to have a hollow cylindrical shape.

3. The housing arrangement as recited in claim 1, further comprising:
    at least one of a radiation axis and an axis of symmetry, wherein,
    the shielding device is configured to have a closed ring shape so as to extend around at least one of the radiation axis and the axis of symmetry.

4. The housing arrangement as recited in claim 1, wherein,
    the at least one tubular body further comprises a proximal end, and
    the shielding device is configured to extend from the distal end to the proximal end of the at least one tubular body.

5. The housing arrangement as recited in claim 1, wherein the shielding device further comprises a layer which is applied to the at least one tubular body.

6. The housing arrangement as recited in claim 1, wherein the shielding device further comprises a foil.

7. The housing arrangement as recited in claim 1, wherein the shielding device further comprises a part which is separate from the tubular body.

8. The housing arrangement as recited in claim 1, wherein,
    the side wall of the at least one tubular body comprises a wall thickness, a front side and a rear side, and
    the wall thickness is configured to at least partially mutually weaken or to eliminate two radar waves which are reflected on the front side and on the rear side of the side wall in a region of the shielding device.

9. The housing arrangement as recited in claim 1, wherein at least a section of the at least one tubular body comprises a radar radiation absorbing material.

10. The housing arrangement as recited in claim 1, wherein at least a section of the at least one tubular body comprises a material which comprises conductive particles.

11. The housing arrangement as recited in claim 1, further comprising:
    at least one of a radar transmitter and a radar receiver, wherein,
    the at least one tubular body further comprises a proximal end, and
    the at least one of the radar transmitter and the radar receiver is arranged at the proximal end in the at least one tubular body.

12. The housing arrangement as recited in claim 1, further comprising:

a protective device which is configured to cover the shielding device from an outside.

13. A radar sensor comprising:
the housing arrangement as recited in claim 1; and
at least one of a radar transmitter and a radar receiver.

* * * * *